UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

DIAMIDO BASE.

SPECIFICATION forming part of Letters Patent No. 516,753, dated March 20, 1894.

Application filed December 13, 1893. Serial No. 493,592. (Specimens.) Patented in France April 6, 1892, No. 220,724; in Germany April 6, 1892, No. 66,737, and in England May 17, 1892, No. 9,360.

*To all whom it may concern:*

Be it known that I, JOHANN JAKOB BRACK, a citizen of the Swiss Republic, residing at Basle, Switzerland, have invented new and useful Improvements in the Production of Diamido Bases, (partly patented by the firm L. Durand, Huguenin & Co., of St. Fons, near Lyon, France, Basle, Switzerland, and Hüningen, Germany, in France by Letters Patent No. 220,724, dated April 6, 1892, with Letters Patent of addition dated April 30, 1892; in England by Letters Patent No. 9,360, dated May 17, 1892, and in Germany by Letters Patent No. 66,737, dated April 6, 1892, and Letters Patent of addition No. 68,920, dated May 2, 1892;) and I do hereby declare the following to be a full, clear, and exact description of the invention.

This invention relates to the manufacture of new diamido-bases, suitable for the production of substantive cotton dyes and obtained by the condensation of one molecule formaldehyde, with a mixture of one molecule of a paradiamin such, for instance, as benzidin and tolidin, and one molecule of the basic hydrochlorate of an aromatic diamin, such for instance as basic hydrochlorate of tolidin, basic hydrochlorate of benzidin, basic hydrochlorate of metaphenylendiamin and basic hydrochlorate of paraphenylendiamin.

By way of examples, I will describe the mode of producing some of these new diamido-bases.

I. *Diamido-base derived from formaldehyde, tolidin and basic hydrochlorate of metaphenylendiamin.*—21.2 kilos of tolidin and 14.4 kilos of basic hydrochlorate of metaphenylendiamin (or a mixture of one-half molecule of metaphenylendiamin and one-half molecule of neutral hydrochlorate of metaphenylendiamin) are stirred together with ten kilos of alcohol to form a thick paste, to which is then added 7.5 kilos of a forty per cent. formaldehyde solution. The reaction at once takes place under spontaneous heating of the mass. The reaction is completed by heating for several hours on a water bath, the alcohol employed being recovered by distillation. The reaction product is treated with hot, dilute hydrochloric acid and the new diamido-base, dissolved as a hydrochlorate salt, is precipitated in the form of a light brown powder by the addition of ammonia. When heated to 130° centigrade, the new diamido-base forms a resin-like mass which becomes decomposed at higher temperatures. It is only slightly soluble in hot alcohol and benzene, and is nearly insoluble in ether. Its hydrochlorate and sulfate salts are readily soluble in water. The new base has apparently the following formula:

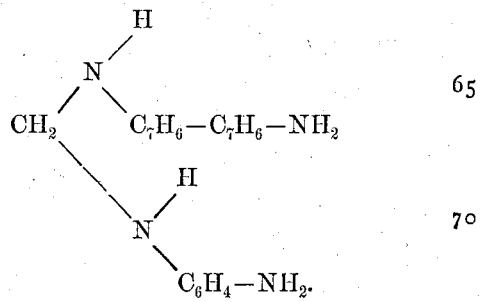

A body of identical constitution is obtained if in the above example, the hydrochlorate of metaphenylendiamin is replaced by hydrochlorate of paraphenylendiamin.

II. *Diamido-base derived from formaldehyde, tolidin and basic hydrochlorate of tolidin.*—For the production of this new diamido-base the following process is employed: 21.2 kilos of tolidin and 24.8 kilos of basic tolidin hydrochlorate, are incorporated with ten kilos of alcohol, to form a thick paste and to this are added 7.5 kilos of formaldehyde solution of forty per cent. The mass is allowed to cool and to stand for twelve hours when it assumes by degrees a grayish green color; it is then heated for twelve hours on a water bath. The melt first becomes thinly liquid and then gradually thickens to a resinous consistency and at the end of the operation it forms a tough, pitch-like, green mass, which after cooling, solidifies and is easily pulverized. The reaction product is treated with rather more than the theoretical quantity of hot sulfuric acid; the new base is thereby completely dissolved while the tolidin which remained unaffected by the reaction, is separated by filtration as a salt that dissolves with difficulty. From the sulfate solution the base is precipitated by carbonate of soda as a light green, resinous mass that quickly solidifies. The new base begins to liquefy at from 60° to 65° centigrade and is completely melted at 85° to 90° centigrade; it is easily soluble in alcohol, only slightly soluble in benzene, and almost insoluble in ether; its hydrochlorate and sulfate are readily soluble in water. The probable formula of this new body, called "formaldehyde-tolidin" may be assumed to be:

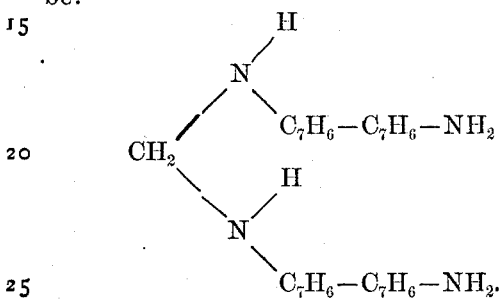

This new body can be diazotized; the nitrite consumed corresponds tolerably accurately with the two amido-groups of the above formula. The diazo-compound, only slightly soluble in water, forms, for example, with naphthylamin, sulfo acids, substantive cotton dyes.

III. *Diamido-base derived from formaldehyde, benzidin and basic hydrochlorate of benzidin.*—For the production of the condensation product from benzidin, hydrochlorate of benzidin and formaldehyde, the following process is employed. 18.4 kilos of benzidin and twenty-two kilos of basic benzidin hydrochlorate, are incorporated with sufficient alcohol to produce a thick paste and this paste is added to seventy-five kilos of formaldehyde solution of forty per cent. The mass is then left to stand for twelve hours, when it solidifies and assumes a light yellow color; it is then heated for twelve hours up to 100° centigrade or more. The melt forms a tough, resin-like, greenish yellow mass, which, on cooling, becomes hard and brittle. The reaction product is treated with rather more than the theoretical quantity of dilute, hot, sulfuric acid; the new base is thereby completely dissolved, while the benzidin, which is not affected by the reaction, is separated by filtration as a sulfate, of difficult solution. From the sulfate solution the base is precipitated by alkalies, in the form of a light yellow, flocculent precipitate. This new base, called "formaldehyde-benzidin," melts between 84° and 100° centigrade; it is slightly soluble in hot alcohol, but almost insoluble in benzene and ether; its sulfate and hydrochlorate are easily soluble in water. By treating the sulfate solution with nitrite, a tetrazo-compound is obtained that dissolves with difficulty in water, and which forms, for example, with naphtylamin sulfonic acid, substantive cotton dyes.

All of the bases described above are insoluble in water.

What I claim as my invention, and wish to secure by Letters Patent, is—

1. The herein described process for the production of diamido-bases applicable to the manufacture of substantive cotton dyes, which consists in condensing, with the aid of heat, one molecule of formaldehyde with a mixture of one molecule of a paradiamin and one molecule of the chlohydrate of an aromatic diamin, as set forth.

2. The herein described process for the production of diamido-bases, which consists in condensing with the aid of heat one molecule of formaldehyde, with a mixture of one molecule of tolidin and one molecule of the chlohydrate of an aromatic diamin, as set forth.

3. The herein described diamido-base, applicable to the manufacture of substantive cotton dyes, which is derived from formaldehyde, tolidin and metaphenylendiamin, and which, in a dry state, is a light brown powder, only slightly soluble in hot alcohol and benzene, nearly insoluble in ether, forms, when heated to 130° centigrade, a resin-like mass which becomes decomposed at higher temperature and which forms hydrochlorate and sulfate salts which are readily soluble in water, as set forth.

In witness whereof I have hereunto signed my name in the presence of two subscribing witnesses.

JOHANN JAKOB BRACK.

Witnesses:
THEODORE STACHELIN,
AMAND RITTER.